May 13, 1924.
J. D. CULVERHOUSE
VALVE GEAR OR MOTION
Filed Aug. 11, 1923
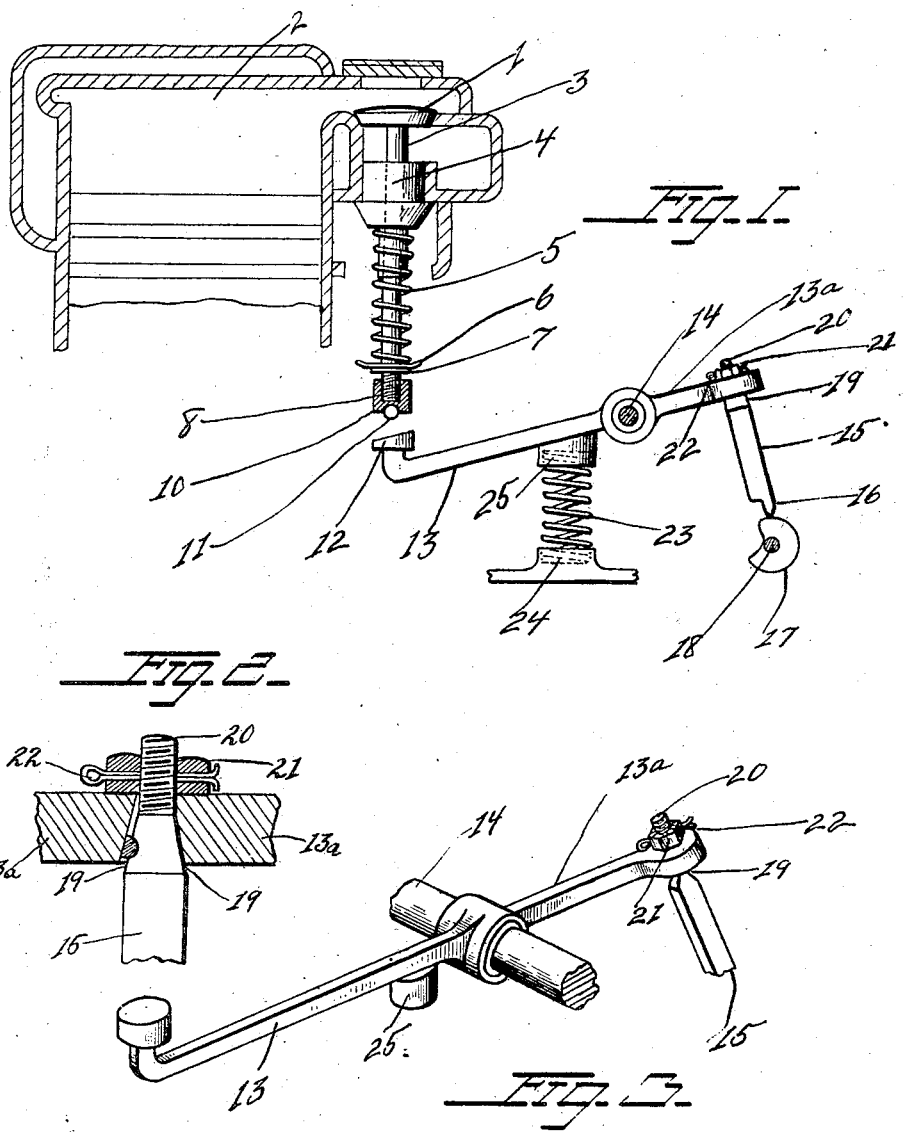
Inventor
John D. Culverhouse,
By G. Hume Talbert
Attorney Patented May 13, 1924.

1,494,217

UNITED STATES PATENT OFFICE.

JOHN DURR CULVERHOUSE, OF LOS ANGELES, CALIFORNIA.

VALVE GEAR OR MOTION.

Application filed August 11, 1923. Serial No. 656,951.

*To all whom it may concern:*

Be it known that I, JOHN DURR CULVERHOUSE, a citizen of the United States of America, residing at Los Angeles, in the county of Los Angeles and State of California, have invented new and useful Improvements in Valve Gears or Motion, of which the following is a specification.

The object of the invention is to provide a cam actuated valve gear or motion in which valve opening movement occurs at the fall of the cam, so that the valve will be insured of full opening movement at the proper instant which may be timed more accurately at the fall than at the rise of the cam.

With this object in view the invention consists in a certain construction and combination of parts of which a preferred embodiment is shown in the accompanying drawings but which does not define the limits of the invention.

Figure 1 is a side elevational view of the improved mechanism, the valve housing and adjacent cylinder being shown in section.

Figure 2 is a detail sectional view.

Figure 3 is a perspective view of the rocker.

The invention is designed to communicate opening movement to the valve 1 which may be either the inlet or outlet valve of the cylinder 2, the valve being provided with a stem 3 slidably mounted in a guide 4 and held normally seated by a compression spring 5 in surrounding relation to the stem and abutting at one end a shoulder on the guide and at the other end engaging a washer 6 below which and straddling the stem is the U-shaped clip 7 the arms of which engage peripheral grooves formed in the stem. The stem, as is usual, is terminally threaded as indicated at 8 and carries a washer 9 and a tappet head 10 both of which are engaged with the threaded end, the tappet head being provided with a ball inset 11 for engagement with the head 12 of the rocker 13 which is pivotally mounted as at 14 and has an arm 13ª extending beyond the pivot and in the opposite direction from the head 12, this arm 13ª having secured to it the arm 15 formed with a pointed nose 16 traversing the cam 17 which is of the usual variety and actuated from the cam shaft 18 in the usual manner. The upper end of the arm 15 is tapered as indicated at 19 for seating in a correspondingly shaped hole in the arm 13ª of the rocker, and also is keyed in with a Woodruff key, the conical portion terminating in an exteriorly threaded stud 20 projecting beyond the upper surface of the arm 13ª for the reception of the castle nut 21 which is secured against turning movement by a cotter pin 22 or other key inserted through a transverse hole in the stud portion and engaging diametrically opposite slots in the castle nut. Obviously the rotation of the cam 17 will dispose the rocker in such a position that the head 12 will be spaced from the ball 11 of the tappet head 10 and may only impact with the ball when the nose 16 reaches the fall of the cam which in the present form of cam is provided by the removal of a sector. The arm 15 will, of course, drop when it reaches the fall of the cam but in order that gravity alone may not be relied upon to raise or open the valve, a compression spring 23 is provided engaged at its lower end in a seat 24 and at its upper end in a seat 25 formed on the lower edge of the rocker between the head 12 and the pivot point. The pressure of the spring 23 is sufficient to overcome the pressure of the valve spring and thus when the nose 16 reaches the fall of the cam, the spring 23 is free to act, raising the nose of the rocker and consequently lifting the valve from its seat, retaining an open position until the nose of the arm 15 again reaches the rise of the cam, when the valve spring effects seating movement of the valve and the latter is retained closed until the cam has made another revolution.

Having described the invention, what is claimed as new and useful is:—

A mechanism for the purpose indicated comprising in combination with a spring seated valve having a tappet head, of a rocker having a head for impact with said tappet head, a compression spring engaged with said rocker and normally forcing the head of the latter toward the tappet head, a cam, and an arm carried by the rocker and traversing the surface of the cam to maintain the head of the rocker out of contact with the valve tappet head except when the extremity of the arm reaches the fall of the cam, said spring being terminally engaged with seats formed respectively in the underside of said rocker and at a fixed point with relation thereto.

In testimony whereof he affixes his signature.

JOHN DURR CULVERHOUSE.